(12) United States Patent
Xu et al.

(10) Patent No.: US 11,558,925 B2
(45) Date of Patent: Jan. 17, 2023

(54) NOTIFICATION METHOD AND DEVICE FOR EXECUTION OF PDCP DATA RECOVERY

(71) Applicant: China Academy of Telecommunications Technology, Beijing (CN)

(72) Inventors: Meng Xu, Beijing (CN); Chandrika Kumudinie Worrall, Beijing (CN); Jing Liang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/958,705

(22) PCT Filed: Dec. 28, 2018

(86) PCT No.: PCT/CN2018/125092
§ 371 (c)(1),
(2) Date: Jun. 28, 2020

(87) PCT Pub. No.: WO2019/129252
PCT Pub. Date: Jul. 4, 2019

(65) Prior Publication Data
US 2020/0359450 A1 Nov. 12, 2020

(30) Foreign Application Priority Data
Dec. 29, 2017 (CN) .................. 201711476873.X

(51) Int. Cl.
*H04W 76/19* (2018.01)
*H04W 80/08* (2009.01)
(Continued)

(52) U.S. Cl.
CPC ....... *H04W 80/08* (2013.01); *H04W 12/0433* (2021.01); *H04W 36/04* (2013.01);
(Continued)

(58) Field of Classification Search
CPC . H04W 80/08; H04W 12/0433; H04W 76/19; H04W 76/27; H04W 36/04;
(Continued)

(56) References Cited

U.S. PATENT DOCUMENTS

2017/0359854 A1* 12/2017 Chiba .................. H04W 76/15
2018/0184475 A1* 6/2018 Babaei ................ H04L 27/0006
(Continued)

FOREIGN PATENT DOCUMENTS

| CN | 104936175 A | 9/2015 |
| EP | 3468083 A1 | 4/2019 |
| WO | 2016071076 A1 | 5/2016 |

OTHER PUBLICATIONS

3GPP122 (TP on PSCell change clarification and removal of SCG Change, R2-1714122, Nov. 2017).*
(Continued)

*Primary Examiner* — Lakeram Jangbahadur
(74) *Attorney, Agent, or Firm* — Kilpatrick Townsend & Stockton, LLP

(57) ABSTRACT

A notification method and device for the execution of PDCP data recovery, and same is used to notify an SN to execute a PDCP data recovery process. The notification method for the execution of packet data convergence protocol (PDCP) data recovery comprises: a primary base station sending an inter-node signaling message between the primary base station and a secondary base station to the secondary base station to notify the secondary base station of the execution of a PDCP data recovery process, and the inter-node signaling message is used to instruct the secondary base station (Continued)

to execute a PDCP data recovery process. The method for executing packet data convergence protocol (PDCP) data recovery comprises: the secondary base station receiving the inter-node signaling message sent by the primary base station.

16 Claims, 2 Drawing Sheets

(51) Int. Cl.
  *H04W 76/27* (2018.01)
  *H04W 36/04* (2009.01)
  *H04W 80/02* (2009.01)
  *H04W 12/0433* (2021.01)
  *H04W 84/18* (2009.01)

(52) U.S. Cl.
  CPC ........... *H04W 76/19* (2018.02); *H04W 76/27* (2018.02); *H04W 80/02* (2013.01); *H04W 84/18* (2013.01)

(58) Field of Classification Search
  CPC . H04W 80/02; H04W 84/18; H04W 36/0033; H04W 36/0069; H04W 4/50; H04W 76/15; H04W 12/04; H04W 56/002; H04W 56/003; H04W 36/0055; H04W 36/02; H04W 36/0038; H04W 92/20; H04L 1/0023
  See application file for complete search history.

(56) References Cited

U.S. PATENT DOCUMENTS

| | | | |
|---|---|---|---|
| 2018/0279218 A1* | 9/2018 | Park | H04W 36/08 |
| 2019/0268818 A1* | 8/2019 | Yi | H04W 80/08 |

OTHER PUBLICATIONS

3GPP105 (Impact on Control and User Plane procedure due to Intra and Inter CU HO, R2-1707105, Jun. 2017).*
ZTE Corporation, "[Offline discussion #19] TP on PSCell change clarification and removal of SCG Change", 3GPP TSG RAN WG2 Meeting #100, Reno, USA, Nov. 27-Dec. 1, 2017, total 11 pages, R2-1714122.
Ran2, "LS on replacement of "SCG change indication" with "PDCP change indication"", 3GPP TSG RAN WG2 Meeting #100, Reno, USA, Nov. 27-Dec. 1, 2017, total 1 page, R2-1714169.
CATT, "Discussion on SCG Change", 3GPP TSG-RAN WG2 Meeting #99bis, Prague, Czech Republic, Oct. 9-13, 2017, total 3 pages, R2-1710293.
CATT,"Support of PDCP data recovery at SN during intra-eNB HO in EN-DC", 3GPP TSG-RAN WG2 NR Ad hoc 1801, Vancouver, Canada, of Jan. 22-26, 2018, total 3 pages, R2-1800125.
Ericsson,"Removing data forwarding from corresponding node for EN-DC-37.340 TP", 3GPP TSG-RAN WG3 Meeting#98, Reno, NV, U.S., Nov. 27-Dec. 1, 2017, total 15 pages, R3-174834.
Samsung,"Impact on Control and User Plane procedure due to intra and inter CU HO", 3GPP TSG RAN WG2#NR_AdHoc#2 Meeting, Qingdao, China, Jun. 27-29, 2017, total 4 pages, R2-1707105.

* cited by examiner

NOTIFICATION METHOD AND DEVICE FOR EXECUTION OF PDCP DATA RECOVERY

The present application is a National Stage of International Application No. PCT/CN2018/125092, filed on Dec. 28, 2018, which claims the priority from Chinese Patent Application No. 201711476873.X, filed with the Chinese Patent Office on Dec. 29, 2017 and entitled "Notification Method and Device for Execution of PDCP Data Recovery", both of which are hereby incorporated by reference in their entireties.

FIELD OF DISCLOSURE

The disclosure relates to the field of communication technologies, and in particular, to a method and device for notifying the execution of PDCP data recovery.

BACKGROUND

At present, in a Dual Connectivity (DC) scenario, a User Equipment (UE) can simultaneously connect to two Radio Access Network (RAN) nodes that provide communication services to it, and one RAN node is the Master Node (MN), and the other is the Secondary Node (SN). Here, the MN can generate the wireless configuration information at the MN side, the SN can generate the wireless configuration information at the SN side, and each of the MN and the SN may include multiple cells providing services to the UE, where one of the multiple cells is the Primary Cell (PCell), and the rest are Secondary Cells (SCells). When the SN is configured at the network side to provide services to the UE, if the primary cell handover in the MN (Intra-MN) occurs or is the same as the process of the primary cell handover in the Central Device (CU) (intra-CU handover) of the radio access network, since the MN or CU has not changed, the position of the Packet Data Convergence Protocol (PDCP) has not changed. Therefore, the security key may not be updated, that is, there is no need to perform the corresponding PDCP reestablishment process, but the MN needs to perform the PDCP data recovery process and the corresponding lower-layer synchronous reconfiguration process. In the dual connectivity scenario, the SN also provides the user with the data transmission process. In order to achieve the synchronization between the MN and the SN, the SN side also needs to perform the PDCP data recovery process, but for the Intra-MN or intra-CU handover, the MN node may know that the PDCP data recovery process needs to be performed, but the SN cannot know it. Meanwhile, for this scenario, there is no solution of triggering the SN to execute the PDCP data recovery at present.

BRIEF SUMMARY

The embodiments of the disclosure provide a method and device for notifying the execution of PDCP data recovery, so as to notify the SN to execute the PDCP data recovery process.

According to one embodiment, a method for notifying the execution of PDCP data recovery is provided, which includes:

sending, by a Master Node, MN, an inter-node signaling message between the MN and a Secondary Node, SN to the SN to notify the SN to execute a PDCP data recovery process, and the inter-node signaling message is used for instructing the SN to execute the PDCP data recovery process.

In one embodiment, before the sending, by the MN, the inter-node signaling message between the MN and the SN to the SN to notify the SN to execute the PDCP data recovery process, the method further includes:

triggering, by the MN, an intra-MN primary cell handover process in the MN or an intra-CU primary cell handover process in a central node of a radio access network, and determining, by the MN, to keep the SN and without security key update.

In one embodiment, the inter-node signaling message carries indication information that is encoded in a coding format of X2/Xn AP message or in a coding format of RRC message; and the indication information is used for instructing the SN to execute the PDCP data recovery process.

In one embodiment, the method further includes:

carrying, by the MN, indication information through a newly defined first field in the inter-node signaling message, the indication information being used for instructing the SN to execute the PDCP data recovery process; and the first field is an optional attribute or mandatory attribute field; or carrying, by the MN, the indication information by reusing a second field in the inter-node signaling message; and the second field includes at least two coding forms, different coding forms are used for carrying different information, and one of the at least two coding forms is used for carrying the indication information.

In one embodiment, if the MN and the SN are in a Multi-RAT Dual Connectivity (MR-DC) scenario respectively, the inter-node signaling message is a secondary node modification request message in a SN modification process initiated by the MN.

In one embodiment, the second field reuses a PDCP change indication for notifying the SN to update a security key; and a coding form of the PDCP change indication when instructing the SN to execute the PDCP data recovery is different from a coding form of the PDCP change indication when instructing the SN to update the security key.

In one embodiment, the inter-node signaling message includes a synchronous reconfiguration request, to which the SN determines whether to execute the PDCP data recovery process according; and if the synchronous reconfiguration request does not carry an updated security key or information instructing the SN to update a security key, the SN determines to execute the PDCP data recovery process.

In one embodiment, the inter-node signaling message is further used for instructing the SN to execute a lower-layer synchronous reconfiguration process corresponding to the PDCP data recovery process; and the lower-layer synchronous reconfiguration process includes one or more of a Radio Link Control (RLC) entity reestablishment process, a Media Access Control (MAC) entity reset process and a random access process.

According to one embodiment, a method for executing the PDCP data recovery is provided, which includes:

receiving, by a Secondary Node, SN, an inter-node signaling message sent by a Master Node, MN; and the inter-node signaling message is used for instructing the SN to execute a PDCP data recovery process;

executing, by the SN, the PDCP data recovery process according to the inter-node signaling message.

In one embodiment, the inter-node signaling message carries indication information through a newly defined first field, and the indication information is used for instructing the SN to execute the PDCP data recovery process; and the first field is an optional attribute or mandatory attribute field; or the inter-node signaling message carries the indication information through a reused second field, and the second field includes at least two coding forms, different coding forms are used for carrying different information, and one of the at least two coding forms is used for carrying the indication information.

In one embodiment, before the executing, by the SN, the PDCP data recovery process according to the inter-node signaling message, the method further includes:

determining, by the SN, whether the first field has a valid value for instructing the SN to execute the PDCP data recovery process; or determining, by the SN, whether the second field has a valid value for instructing the SN to execute the PDCP data recovery process;

determining, by the SN, to execute the PDCP data recovery process if a determination result is yes.

In one embodiment, if the second field reuses a PDCP change indication for notifying the SN to update a security key, and a coding form of the PDCP change indication when instructing the SN to execute the PDCP data recovery is different from a coding form of the PDCP change indication when instructing the SN to update the security key, then the method further includes:

determining, by the SN, to execute the PDCP data recovery process if the SN determines that the PDCP change indication has a valid value for instructing the SN to execute the PDCP data recovery process; or determining, by the SN, to execute a security key update process if the SN determines that the PDCP change indication has a valid value for instructing the SN to execute the security key update process.

In one embodiment, the inter-node signaling message includes a synchronous reconfiguration request, the method further includes:

determining, by the SN, whether to execute the PDCP data recovery process according to the synchronous reconfiguration request;

determining, by the SN, to execute the PDCP data recovery process if the synchronous reconfiguration request does not carry an updated security key or information instructing the SN to update a security key.

In one embodiment, the inter-node signaling message is further used for instructing the SN to execute a lower-layer synchronous reconfiguration process corresponding to the PDCP data recovery process, the method further includes:

determining, by the SN, to execute the lower-layer synchronous reconfiguration process according to the inter-node signaling message; and the lower-layer synchronous reconfiguration process includes one or more of an RLC entity reestablishment process, an MAC entity reset process and a random access process.

According to one embodiment, a base station is provided, which is a Master Node, MN in dual-connection and multi-connection communication systems and includes:

a memory configured to store instructions;

a processor configured to read the instructions in the memory to perform the process of:

sending an inter-node signaling message between the MN and a Secondary Node, SN to the SN via a transceiver to notify the SN to execute a PDCP data recovery process, and the inter-node signaling message is used for instructing the SN to execute the PDCP data recovery process;

the transceiver configured to send data under control of the processor.

In one embodiment, the processor is further configured to read the instructions in the memory to perform the process of triggering an intra-MN primary cell handover process in the MN or an intra-CU primary cell handover process in a central node of a radio access network, and determine to keep the SN and without security key update before sending the inter-node signaling message between the MN and the SN to the SN via the transceiver to notify the SN to execute the PDCP data recovery process.

In one embodiment, the inter-node signaling message carries indication information that is encoded in a coding format of X2/Xn AP message or in a coding format of Radio Resource Control (RRC) message; and the indication information is used for instructing the SN to execute the PDCP data recovery process.

In one embodiment, the processor is further configured to read the instructions in the memory to perform the process of:

carrying indication information through a newly defined first field in the inter-node signaling message, the indication information being used for instructing the SN to execute the PDCP data recovery process; and the first field is an optional attribute or mandatory attribute field; or carrying the indication information by reusing a second field in the inter-node signaling message; and the second field includes at least two coding forms, different coding forms are used for carrying different information, and one of the at least two coding forms is used for carrying the indication information.

In one embodiment, if the MN and the SN are in an MR-DC scenario, the inter-node signaling message is a secondary node modification request message in a secondary node modification process initiated by the MN.

In one embodiment, the second field reuses a PDCP change indication for notifying the SN to update a security key; and a coding form of the PDCP change indication when instructing the SN to execute the PDCP data recovery is different from a coding form of the PDCP change indication when instructing the SN to update the security key.

In one embodiment, the inter-node signaling message includes a synchronous reconfiguration request, to which the SN determines whether to execute the PDCP data recovery process according; and if the synchronous reconfiguration request does not carry an updated security key or information instructing the SN to update a security key, the SN determines to execute the PDCP data recovery process.

In one embodiment, the inter-node signaling message is further used for instructing the SN to execute a lower-layer synchronous reconfiguration process corresponding to the PDCP data recovery process; and the lower-layer synchronous reconfiguration process includes one or more of an RLC entity reestablishment process, an MAC entity reset process and a random access process.

According to one embodiment, a base station is provided, which serves as a Secondary Node, SN in dual-connection and multi-connection communication systems and includes:

a memory configured to store instructions;

a processor configured to read the instructions in the memory to perform the process of:

receiving an inter-node signaling message sent by a Master Node, MN via a transceiver; and the inter-node signaling message is used for instructing the SN to execute a PDCP data recovery process;

executing the PDCP data recovery process according to the inter-node signaling message;

the transceiver configured to receive data under control of the processor.

In one embodiment, the inter-node signaling message carries indication information through a newly defined first field, and the indication information is used for instructing the SN to execute the PDCP data recovery process; and the first field is an optional attribute or mandatory attribute field; or the inter-node signaling message carries the indication information through a reused second field, and the second field includes at least two coding forms, different coding forms are used for carrying different information, and one of the at least two coding forms is used for carrying the indication information.

In one embodiment, the processor is further configured to read the instructions in the memory to perform the process of:
  determining whether the first field has a valid value for instructing the SN to execute the PDCP data recovery process; or determining whether the second field has a valid value for instructing the SN to execute the PDCP data recovery process before the processor executes the PDCP data recovery process according to the inter-node signaling message;
  determining to execute the PDCP data recovery process if a determination result is yes.

In one embodiment, if the second field reuses a PDCP change indication for notifying the SN to update a security key, and a coding form of the PDCP change indication when instructing the SN to execute the PDCP data recovery is different from a coding form of the PDCP change indication when instructing the SN to update the security key, the processor is further configured to read the instructions in the memory to perform the process of:
  determining to execute the PDCP data recovery process if it is determined that the PDCP change indication has a valid value for instructing the SN to execute the PDCP data recovery process; or
  determining to execute a security key update process if it is determined that the PDCP change indication has a valid value for instructing the SN to execute the security key update process.

In one embodiment, the inter-node signaling message includes a synchronous reconfiguration request, the processor is further configured to read the instructions in the memory to perform the process of:
  determining whether to execute the PDCP data recovery process according to the synchronous reconfiguration request;
  determine to execute the PDCP data recovery process if the synchronous reconfiguration request does not carry an updated security key or information instructing the SN to update a security key.

In one embodiment, the inter-node signaling message is further used for instructing the SN to execute a lower-layer synchronous reconfiguration process corresponding to the PDCP data recovery process, the processor is further configured to read the instructions in the memory to perform the process of:
  determining to execute the lower-layer synchronous reconfiguration process according to the inter-node signaling message; and the lower-layer synchronous reconfiguration process includes one or more of an RLC entity reestablishment process, an MAC entity reset process and a random access process.

According to one embodiment, a base station is provided, which serves as a Master Node, MN in dual-connection and multi-connection communication systems, and includes:
  a sending device configured to send an inter-node signaling message between the MN and a Secondary Node, SN to the SN to notify the SN to execute a PDCP data recovery process, and the inter-node signaling message is used for instructing the SN to execute the PDCP data recovery process.

In one embodiment, the MN further includes a determining device;
  the determining device is configured to trigger an intra-MN of primary cell handover process in the MN or an intra-CU primary cell handover process in a central node of a radio access network, and determine to keep the SN and without security key update.

In one embodiment, the inter-node signaling message carries indication information that is encoded in a coding format of X2/Xn AP message or in a coding format of RRC message; and the indication information is used for instructing the SN to execute the PDCP data recovery process.

In one embodiment, the MN carries the indication information through a newly defined first field in the inter-node signaling message, the indication information being used for instructing the SN to execute the PDCP data recovery process; and the first field is an optional attribute or mandatory attribute field; or
  the MN carries the indication information by reusing a second field in the inter-node signaling message; and the second field includes at least two coding forms, different coding forms are used for carrying different information, and one of the at least two coding forms is used for carrying the indication information.

In one embodiment, if the MN and the SN are in an MR-DC scenario, the inter-node signaling message is a secondary node modification request message in a secondary node modification process initiated by the MN.

In one embodiment, the second field reuses a PDCP change indication for notifying the SN to update a security key; and a coding form of the PDCP change indication when instructing the SN to execute the PDCP data recovery is different from a coding form of the PDCP change indication when instructing the SN to update the security key.

In one embodiment, the inter-node signaling message is a message including a synchronous reconfiguration request, to which the SN determines whether to execute the PDCP data recovery process according; and if the synchronous reconfiguration request does not carry an updated security key or information instructing the SN to update a security key, the SN determines to execute the PDCP data recovery process.

In one embodiment, the inter-node signaling message is further used for instructing the SN to execute a lower-layer synchronous reconfiguration process corresponding to the PDCP data recovery process; and the lower-layer synchronous reconfiguration process includes one or more of an RLC entity reestablishment process, an MAC entity reset process and a random access process.

According to one embodiment, a base station is provided, which serves as a Secondary Node, SN in dual-connection and multi-connection communication systems, and includes:
  a receiving device configured to receive an inter-node signaling message sent by a Master Node, MN; and the inter-node signaling message is used for instructing the SN to execute a PDCP data recovery process;
  an execution device configured to execute the PDCP data recovery process according to the inter-node signaling message.

In one embodiment, the inter-node signaling message carries the indication information through a newly defined first field, and the indication information is used for instructing the SN to execute the PDCP data recovery process; and the first field is an optional attribute or mandatory attribute field; or the inter-node signaling message carries the indication information through a reused second field, and the second field includes at least two coding forms, different coding forms are used for carrying different information, and one of the at least two coding forms is used for carrying the indication information.

In one embodiment, the SN further includes a second determining device;

the determining device is configured to determine whether the first field has a valid value for instructing the SN to execute the PDCP data recovery process; or determine whether the second field has a valid value for instructing the SN to execute the PDCP data recovery process;

the determining device is further configured to determine to execute the PDCP data recovery process if the determination result is yes.

In one embodiment, if the second field reuses a PDCP change indication for notifying the SN to update a security key, and a coding form of the PDCP change indication when instructing the SN to execute the PDCP data recovery is different from a coding form of the PDCP change indication when instructing the SN to update the security key;

the determining device is further configured to determine to execute the PDCP data recovery process if it is determined that the PDCP change indication has a valid value for instructing the SN to execute the PDCP data recovery process; or determine to execute a security key update process if it is determined that the PDCP change indication has a valid value for instructing the SN to execute the security key update process.

In one embodiment, the inter-node signaling message includes a synchronous reconfiguration request, the SN further includes a third determining device;

the third determining device is configured to determine whether to execute the PDCP data recovery process according to the synchronous reconfiguration request;

the third determining device is further configured to determine to execute the PDCP data recovery process if the synchronous reconfiguration request does not carry an updated security key or information instructing the SN to update a security key.

In one embodiment, the inter-node signaling message is further used for instructing the SN to execute a lower-layer synchronous reconfiguration process corresponding to the PDCP data recovery process, the SN further includes a fourth determining device;

the fourth determining device is configured to determine to execute the lower-layer synchronous reconfiguration process according to the inter-node signaling message; and the underlying synchronous reconfiguration process includes one or more of an RLC entity reestablishment process, an MAC entity reset process and a random access process.

According to one embodiment, a computer readable storage medium is provided, including:

the computer readable storage medium stores computer instructions, which cause a computer to perform the method as described in the other embodiments of the present disclosure when running on the computer.

In the embodiments of the disclosure, the MN may notify the SN to perform the PDCP data recovery process through the inter-node message between the MN and the SN. Thus, when the MN only needs to perform the PDCP data recovery process without updating the security key, the MN can also notify the SN through the inter-node signaling message, so that the SN can also execute the PDCP data recovery process accordingly, which can avoid the introduction of the SN-side link communication interruption and SN-side data loss, so that the data transmissions of the MN and SN to provide services for users can continue to be executed, improving the user experience.

BRIEF DESCRIPTION OF THE DRAWINGS

In order to illustrate the embodiments of the disclosure more clearly, the accompanying figures which need to be used in the embodiments of the disclosure will be introduced below briefly.

DETAILED DESCRIPTION OF THE EMBODIMENTS

The inventor noticed in the inventive process: at present, when the SN is configured at the network side to provide services to UEs, if the MN undergoes the Intra-MN handover or intra-CU handover, the PDCP position has not changed because the MN or CU has not changed. Thus, the security key may not be updated, that is, there is no need to execute the corresponding PDCP reestablishment process, but at this time, the MN needs to execute the PDCP data recovery process and the corresponding lower-layer synchronous reconfiguration process. In the dual connectivity scenario, the SN also provides the user with the data transmission process. In order to achieve the synchronization between the MN and the SN, the SN side also needs to perform the PDCP data recovery process, but for the Intra-MN or intra-CU handover, the MN may know that the PDCP data recovery process needs to be performed, but the SN cannot know it; and for this scenario, there is no solution of triggering the SN to execute the PDCP data recovery at present.

In view of this, an embodiment of the disclosure provides a solution of notifying the SN to execute the PDCP data recovery. In this solution, the MN may notify the SN to perform the PDCP data recovery process through the inter-node signaling message between the MN and the SN. Thus, when the MN only needs to perform the PDCP data recovery process without updating the security key, the MN can also notify the SN through the inter-node signaling message, so that the SN can also execute the PDCP data recovery process accordingly, which can avoid the introduction of the SN-side link communication interruption and SN-side data loss, so that the data transmissions of the MN and SN to provide services for users can continue to be executed, improving the user experience.

Figure 1:
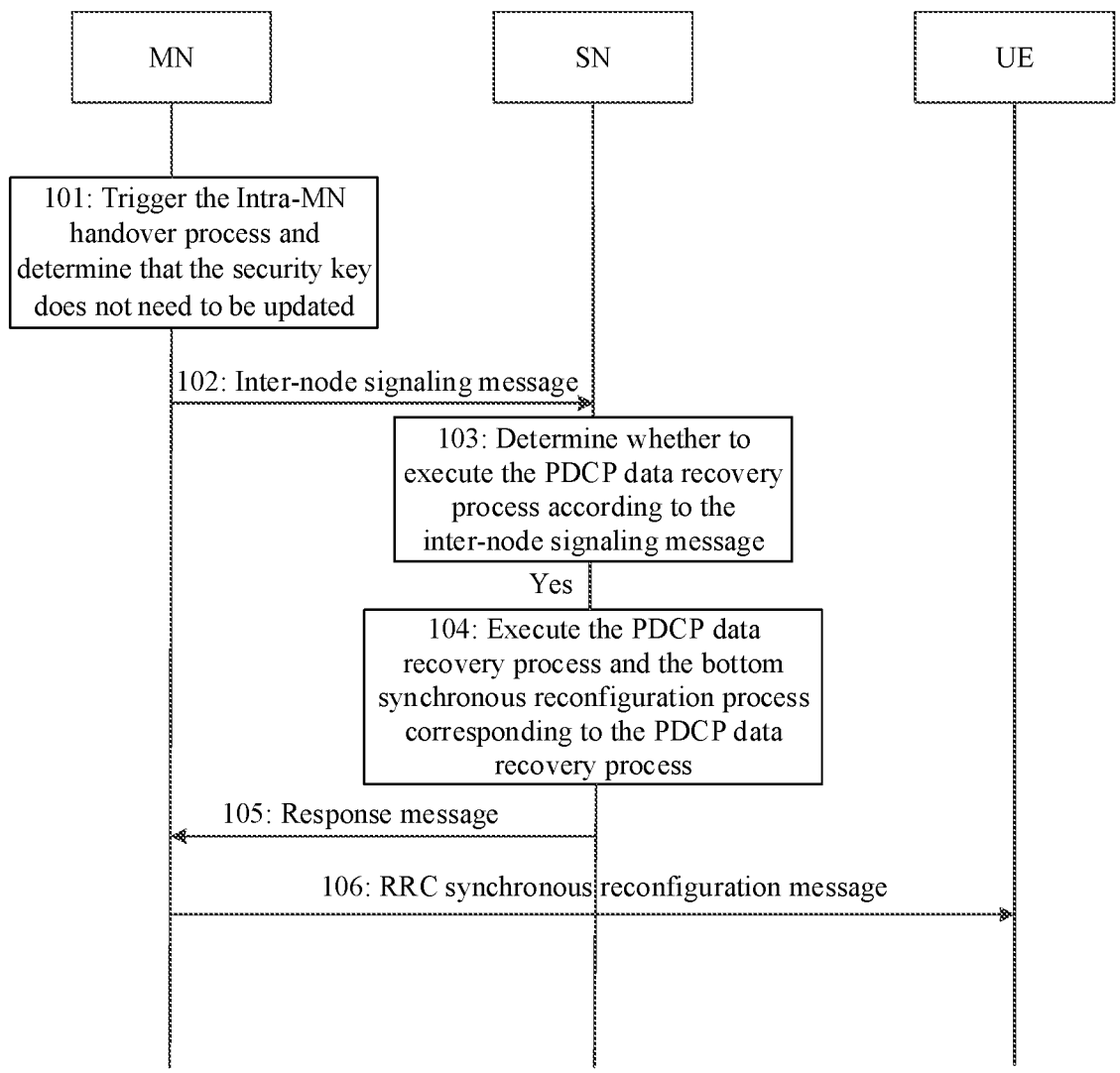
FIG. 1 is a flow schematic diagram of a method provided by an embodiment of the disclosure.

Referring to FIG. 1, an embodiment of the disclosure provides a method of notifying a Secondary Node, SN to execute the PDCP data recovery. This method can be performed by the MN. Taking the intra-MN handover scenario as an example, the flow of this method is described as follows, and the description of the SN-side method is also involved in the following flow description. It should be stated here that the method of the embodiment of the disclosure can be applied to a scenario in which there is a need to notify other network nodes to execute the PDCP data recovery process in the dual-connection and multi-connection communication systems, for example, it is possible to notify an SN or other non-SN nodes to execute the PDCP data recovery process. In the following, the MN notifies the SN to execute the PDCP data recovery process as an example.

Step 101: the MN triggers the Intra-MN handover process and determines that the security key is not updated.

In an embodiment of the disclosure, the MN triggers the Intra-MN handover process. Since only the primary cell in the MN has changed and the MN has not changed, so the position of the PDCP has not changed. Therefore, the security key may not be updated, and there is only a need to perform the PDCP data recovery process and the lower-layer synchronous configuration process corresponding to the PDCP data recovery process. Here, the PDCP data recovery process is to recover the user data transmission that is interrupted due to the Intra-MN handover process, so that the continuity and integrity of the user data that has not been transmitted can be ensured after the Intra-MN handover.

In one embodiment, when the MN performs the Intra-MN handover process, the SN that has been configured for the user may also be maintained. Thus, when the MN needs to execute the PDCP data recovery process, correspondingly, the SN also needs to execute the PDCP data recovery process and the lower-layer synchronous reconfiguration process corresponding to the PDCP data recovery process.

In the implementations of the disclosure, there is no limitation on scenarios in which there is a need to notify the SN to execute the PDCP data recovery process, that is to say, the scenario in which the MN triggers the Intra-MN handover process and the SN remains unchanged is just a possible scenario. In other possible scenarios in which there is a need to notify the SN to execute the PDCP data recovery process, the method of the embodiment of the disclosure is also applicable.

Step 102: the MN sends an inter-node signaling message to the SN, and the SN receives the inter-node signaling message.

In an embodiment of the disclosure, the MN may use the inter-node signaling message between the MN and the SN, where the inter-node signaling message is used for instructing the SN to execute the PDCP data recovery process. Of course, the inter-node signaling message may also be used for instructing the SN to execute the lower-layer synchronous reconfiguration process corresponding to the PDCP data recovery process, and the inter-node signaling message may notify the SN to execute the PDCP data recovery process in an explicit or implicit way.

The explicit way is described below.

In an implementation of the disclosure, the explicit way may be to carry the indication information for instructing the SN to execute the PDCP data recovery process directly in the inter-node signaling message, and the indication information may be encoded in the coding format of X2/Xn AP message, where the X2/Xn is the interface between two base stations, and the X2/Xn AP message is encoded by using the X2/Xn AP protocol; or the indication information may be encoded in the coding format of Radio Resource Control (RRC) message.

In one embodiment, the inter-node signaling message may carry the indication information through a newly defined first field, that is, the first field may be added in the original inter-node signaling message to carry the indication information, and the newly defined first field may be an optional attribute or mandatory attribute field. The optional attribute field means that the first field may not exist or may exist and carry other values different from the valid value when there is no need to carry the indication information; and the mandatory attribute field means that the first field has the valid value instructing the SN to execute the PDCP data recovery process when the indication information is carried, and the first field may have other values different from the valid value if there is no need to carry the indication information.

The number of bits of the first field is not limited in the embodiments of the disclosure, for example, the first field may be 1 bit or 2 bits. For example, when the first field is 1 bit, 0 may indicate that the SN is instructed to execute the PDCP data recovery process. Thus, when the first field is an optional attribute field, it indicates that the SN needs to execute the PDCP data recovery process if the first field exists and is 0; and the SN does not need to execute the PDCP data recovery process if the first field does not exist or exists and is not 0. If the first field is a mandatory attribute field and the first field is 0, it indicates that the SN needs to execute the PDCP data recovery process; if the first field is another value not being 0, for example, the another value may be 1, then SN does not need to execute the PDCP data recovery process. Conversely, it is also possible to stipulate 1 or another value to instruct the SN to execute the PDCP data recovery process. There is no limitation on the use of 0 or 1 or another value to instruct the SN to execute the PDCP data recovery process.

In one embodiment, the inter-node signaling message may carry the indication information by reusing the second field in the inter-node signaling message, and the second field may be any field in the inter-node signaling message, and the second field includes at least two coding forms, different coding forms may be used for carrying different information, and one of the at least two coding forms may be used for carrying the indication information. Of course, the second field may also be an optional attribute or mandatory attribute field in the inter-node signaling message, and the number of bits included in the second field is not limited in the embodiments of the disclosure. The reused second field will be described below for specific application scenarios.

In the MR-DC scenario, the MN may be a base station of E-Utran type or a 5G base station, and the SN is a 5G base station or a base station of E-Utran type. In the MR-DC scenario, when the MN adds, modifies and releases the Secondary Cell Group (SCG) part in the SCG bearer or Master Cell Group (MCG)/SCG split bearer, the MN may initiate a secondary node modification request (SgNB Modification Request) message to notify the SN to update the SCG configuration. In one embodiment, the SgNB Modification Request message may include the bearer context information, UE context information, data forwarding address information, and SCG configuration information that needs to be updated by the SN. If so, the MN needs to notify the SN to update the security key, and the SgNB Modification Request message may further include the PDCP change indication used to notify the SN to execute the security key update process. Therefore, in the MR-DC scenario, the second field may be the PDCP change indication. In a specific application, there is only a need to ensure that the coding form of the PDCP change indication when instructing the SN to execute the PDCP data recovery is different from the coding form when instructing the SN to update the security key. For example, the PDCP change indication may include 1 bit, then it is possible to use 0 to characterize instructing the SN to execute the security key update process, and use 1 to characterize instructing the SN to execute the PDCP data recovery process. Then, the SN may judge the process to be executed according to the specific value of the PDCP change indication after receiving the SgNB Modification Request message. On the contrary, it is also possible to stipulate that 1 is used to characterize instructing the SN to execute the security key update process, and 0 is used to characterize instructing the SN to execute the PDCP data recovery process. Of course, the number of bits used by the PDCP change indication may also be other values, such as 2 bits, which is not limited in the embodiments of the disclosure. Of course, the coding used to characterize the PDCP data recovery process is not limited either.

The implicit way is described below.

In an implementation of the disclosure, the implicit way may be as follows: although the inter-node signaling message does not include the indication information that directly instructs the SN to execute the PDCP data recovery, the SN can judge whether to execute the PDCP data recovery process according to the content included in the inter-node signaling message after receiving the inter-node signaling message.

In one embodiment, the inter-node signaling message may be a message including a synchronous reconfiguration request, and the MN may carry the updated security key in the synchronous reconfiguration request or carry the information instructing the SN to update the security key. Thus, the SN may execute the security key update process according to the synchronous reconfiguration request, and correspondingly, if the MN sends a synchronous reconfiguration request to the SN but the synchronous reconfiguration request does not carry any information instructing the SN to update the security key, e.g., does not carry the updated security key or does not carry the information instructing the SN to update the security key, the SN may know that the synchronous reconfiguration is required and the security key does not need to be updated after receiving such synchronous reconfiguration request, so only the PDCP data recovery process can be executed, that is to say, whether to execute the PDCP data recovery process may be determined by excluding other possibilities.

In an embodiment of the disclosure, in addition to notifying the SN to execute the PDCP data recovery process, the inter-node signaling message may further be used for instructing the SN to perform the lower-layer synchronous reconfiguration process corresponding to the PDCP data recovery process. Thus, the SN may further determine to execute the lower-layer synchronous reconfiguration process when determining to execute the PDCP data recovery process according to the inter-node signaling message, and the lower-layer synchronous reconfiguration process may include one or more of the RLC entity reestablishment process, the MAC entity reset process and the random access process, that is to say, the lower-layer synchronous reconfiguration process may be any one or any combination of these three processes.

In one embodiment, it is possible to instruct the SN to perform the lower-layer synchronous reconfiguration process corresponding to the PDCP data recovery process through the indication information carried in the inter-node signaling message, or it is also possible to instruct the SN to perform the lower-layer synchronous reconfiguration process corresponding to the PDCP data recovery process in an implicit way. For example, as described above, when the MN sends the message including the synchronous reconfiguration request to the SN, it may not carry the updated security key or not carry the information instructing the SN to update the security key. In this way, the SN can determine that the PDCP data recovery process needs to be executed according to the synchronous reconfiguration request, and accordingly determine that the lower-layer synchronous reconfiguration process corresponding to the PDCP data recovery process needs to be executed.

Step 103: the SN determines whether to execute the PDCP data recovery process according to the inter-node signaling message.

In one embodiment, if the MN carries the indication information through the newly defined first field, then the SN may judge whether the first field has a valid value for instructing the SN to execute the PDCP data recovery process after receiving the inter-node signaling message; if so, the SN determines to execute the PDCP data recovery process and the lower-layer synchronous reconfiguration process corresponding to the PDCP data recovery process; and if not, the SN determines that it is not necessary to execute the PDCP data recovery process and the lower-layer synchronous reconfiguration process corresponding to the PDCP data recovery process. For example, the MN initiates the SN modification process to release the MCG split Data Radio Bearer (DRB), so the SgNB Modification Request message sent by the MN to the SN may not contain the first field, or the first field does not carry the valid value instructing the SN to execute the PDCP data recovery process. Then the SN will release the DRB indicated by the MN directly without the synchronous reconfiguration process after receiving the SgNB Modification Request message.

In one embodiment, if the MN carries the indication information through the reused second field, for example, in the MR-DC scenario, the second field may be the PDCP change indication in the SgNB Modification Request message. Then the SN may determine the action that the SN needs to perform based on whether the value of the PDCP change indication is the valid value for instructing the SN to execute the PDCP data recovery process or the valid value for instructing the SN to execute the security key update process after receiving the SgNB Modification Request message. If the value of the PDCP change indication is the valid value for instructing the SN to execute the PDCP data recovery process, the SN determines to execute the PDCP data recovery process and the lower-layer synchronous reconfiguration process corresponding to the PDCP data recovery process; and if the value of the PDCP change indication is the valid value for instructing the SN to execute the security key update process, the SN determines to execute the security key update process.

In one embodiment, if the message containing the synchronous reconfiguration request sent by the MN to the SN does not carry the updated security key or does not carry the information instructing the SN to update the security key, the SN can determine to execute the PDCP data recovery process and the lower-layer synchronous reconfiguration process corresponding to the PDCP data recovery process.

Step 104: the SN executes the PDCP data recovery process and the lower-layer synchronous reconfiguration process corresponding to the PDCP data recovery process when the determination result is yes.

Step 105: the SN sends a response message to the MN, and the MN receives the response message.

After the SN executes the PDCP data recovery process and the lower-layer synchronous reconfiguration process corresponding to the PDCP data recovery process, the UE also needs to perform the synchronous reconfiguration process corresponding to the SN, so the response message generated by the SN may include the information instructing the UE to perform the SN synchronous reconfiguration, and the MN forwards the information instructing the UE to perform the SN synchronous reconfiguration to the UE.

Step 106: the MN sends an RRC synchronous reconfiguration message to the UE, and the UE receives the RRC synchronous reconfiguration message.

After the MN receives the response message from the SN, the MN may send the RRC synchronous reconfiguration message to the UE, and the RRC synchronous reconfiguration message includes the MN synchronous reconfiguration information and the SN synchronous reconfiguration information, to notify the UE not to update the security key but execute the PDCP data recovery process and the corresponding lower-layer synchronous reconfiguration process.

In summary, in the embodiments of the disclosure, the MN may notify the SN to perform the PDCP data recovery process through the inter-node signaling message between the MN and the SN. Thus, when the MN only needs to perform the PDCP data recovery process without updating the security key, the MN can also notify the SN through the inter-node signaling message, so that the SN can also execute the PDCP data recovery process accordingly, which can avoid the introduction of the SN-side link communication interruption and SN-side data loss, so that the data transmissions of the MN and SN to provide services for users can continue to be executed, improving the user experience.

In the embodiments of the disclosure, in order to facilitate the description of the entire process, the process shown in FIG. 1 is described by mixing the methods performed by the MN and the SN, but it should be known that both the MN and the SN are able to perform the corresponding method steps independently.

Figure 2:
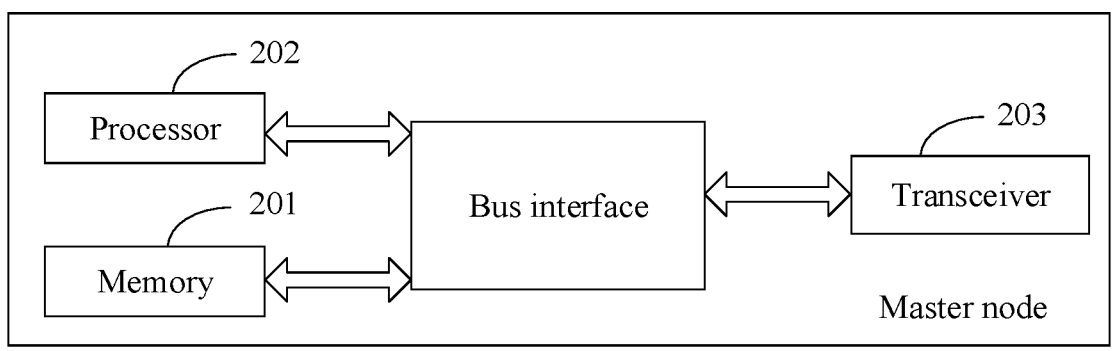
FIG. 2 is a structural schematic diagram of a Master Node, MN provided by an embodiment of the disclosure.

Referring to FIG. 2, based on the same inventive concept, an embodiment of the disclosure further provides a base station, which is a Master Node, MN in dual-connection and multi-connection communication systems. The MN includes a memory 201, a processor 202, and a transceiver 203, and the memory 201 and the transceiver 203 may be connected to the processor 202 through a bus interface (taking this as an example in FIG. 2), or may be connected to the processor 202 through connection lines according to embodiments of the present disclosure.

Here, the memory 201 may be configured to store programs. The processor 202 may be configured to read the programs in the memory 201 to perform the process of: sending an inter-node signaling message between the MN and a Secondary Node, SN to the SN via a transceiver 203 to notify the SN to execute the PDCP data recovery process, and the inter-node signaling message is used for instructing the SN to execute the PDCP data recovery process. The transceiver 203 may be configured to send the data under the control of the processor 202.

In one embodiment, the processor 202 is further configured to trigger the intra-MN primary cell handover process in the MN or the intra-CU primary cell handover process in a central node of a radio access network, and determine that the SN remains unchanged and there is no need to update the security key before sending the inter-node signaling message between the MN and the SN to the SN via the transceiver 203 to notify the SN to execute the PDCP data recovery process.

In one embodiment, the inter-node signaling message carries the indication information that is encoded in the coding format of X2/Xn AP message or in the coding format of Radio Resource Control (RRC) message; and the indication information is used for instructing the SN to execute the PDCP data recovery process.

In one embodiment, the processor 202 is further configured to:
  carry the indication information through a newly defined first field in the inter-node signaling message, the indication information being used for instructing the SN to execute the PDCP data recovery process; and the first field is an optional attribute or mandatory attribute field; or
  carry the indication information by reusing a second field in the inter-node signaling message; and the second field includes at least two coding forms, different coding forms are used for carrying different information, and one of the at least two coding forms is used for carrying the indication information.

In one embodiment, if the MN and the SN are a master base station and a secondary base station in the MR-DC scenario respectively, the inter-node signaling message is a secondary node modification request message in a secondary node modification process initiated by the MN.

In one embodiment, the second field reuses a PDCP change indication for notifying the SN to update a security key; and the coding form of the PDCP change indication when instructing the SN to execute the PDCP data recovery is different from the coding form when instructing the SN to update the security key.

In one embodiment, the inter-node signaling message is a message including a synchronous reconfiguration request, and the SN can determine whether to execute the PDCP data recovery process according to the synchronous reconfiguration request; and if the synchronous reconfiguration request does not carry an updated security key or the information instructing the SN to update a security key, the SN can determine to execute the PDCP data recovery process.

In one embodiment, the inter-node signaling message is further used for instructing the SN to execute a lower-layer synchronous reconfiguration process corresponding to the PDCP data recovery process; and the lower-layer synchronous reconfiguration process includes one or more of an RLC entity reestablishment process, an MAC entity reset process and a random access process.

Here, in FIG. 2, the bus architecture may include any numbers of interconnected buses and bridges, and In one embodiment link various circuits of one or more processors represented by the processor 202 and the memory represented by the memory 201. The bus architecture may further link various other circuits such as peripheral device, voltage regulator and power management circuit, which are all well known in the art and thus will not be further described again herein. The bus interface provides an interface. The transceiver 203 may be a plurality of elements, i.e., include a transmitter and a receiver, and provide the devices for communicating with various other devices over the transmission media. The processor 202 is responsible for managing the bus architecture and general processing, and the memory 201 may store the data used by the processor 202 when performing the operations.

Figure 3:
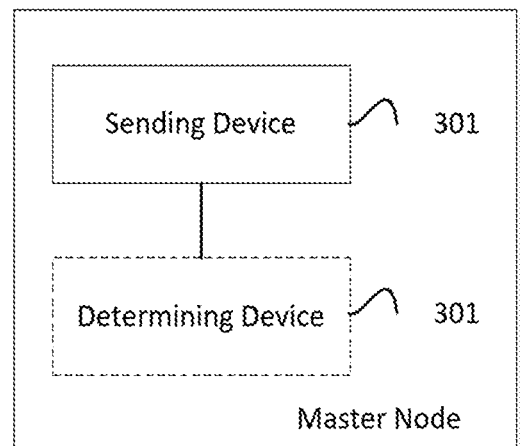
FIG. 3 is a structural schematic diagram of a Master Node, MN provided by an embodiment of the disclosure.

Referring to FIG. 3, based on the same inventive concept, an embodiment of the disclosure provides a base station, which is a Master Node, MN in dual-connection and multi-connection communication systems. This device includes:
- a sending device 301 configured to send an inter-node signaling message between the MN and a Secondary Node, SN to the SN to notify the SN to execute the PDCP data recovery process, and the inter-node signaling message is used for instructing the SN to execute the PDCP data recovery process.

In one embodiment, the MN further includes a determining device 302;
- the determining device 302 is configured to trigger the intra-MN primary cell handover process in the MN or the intra-CU primary cell handover process in a central node of a radio access network, and determine that the SN remains unchanged and there is no need to update a security key.

In one embodiment, the inter-node signaling message carries the indication information that is encoded in the coding format of X2/Xn AP message or in the coding format of RRC message; and the indication information is used for instructing the SN to execute the PDCP data recovery process.

In one embodiment, the MN carries the indication information through a newly defined first field in the inter-node signaling message, the indication information being used for instructing the SN to execute the PDCP data recovery process; and the first field is an optional attribute or mandatory attribute field; or
- the MN carries the indication information by reusing a second field in the inter-node signaling message; and the second field includes at least two coding forms, different coding forms are used for carrying different information, and one of the at least two coding forms is used for carrying the indication information.

In one embodiment, if the MN and the SN are a master base station and a secondary base station in the MR-DC scenario respectively, the inter-node signaling message is a secondary node modification request message in a secondary node modification process initiated by the MN.

In one embodiment, the second field reuses a PDCP change indication for notifying the SN to update the security key; and the coding form of the PDCP change indication when instructing the SN to execute the PDCP data recovery is different from the coding form when instructing the SN to update the security key.

In one embodiment, the inter-node signaling message is a message including a synchronous reconfiguration request, and the SN can determine whether to execute the PDCP data recovery process according to the synchronous reconfiguration request; and if the synchronous reconfiguration request does not carry an updated security key or the information instructing the SN to update a security key, the SN can determine to execute the PDCP data recovery process.

In one embodiment, the inter-node signaling message is further used for instructing the SN to execute a lower-layer synchronous reconfiguration process corresponding to the PDCP data recovery process; and the lower-layer synchronous reconfiguration process includes one or more of an RLC entity reestablishment process, an MAC entity reset process and a random access process.

This device can be used to perform the method provided by the embodiment shown in FIG. 1, so the functions that can be implemented by the functional devices of the device may refer to the description of the embodiment shown in FIG. 1 and will not be repeated, and the first determining device 302 is also shown in FIG. 3, but it should be known that the first determining device 302 is not a mandatory functional device, so it is shown in dashed lines in FIG. 3.

Figure 4:
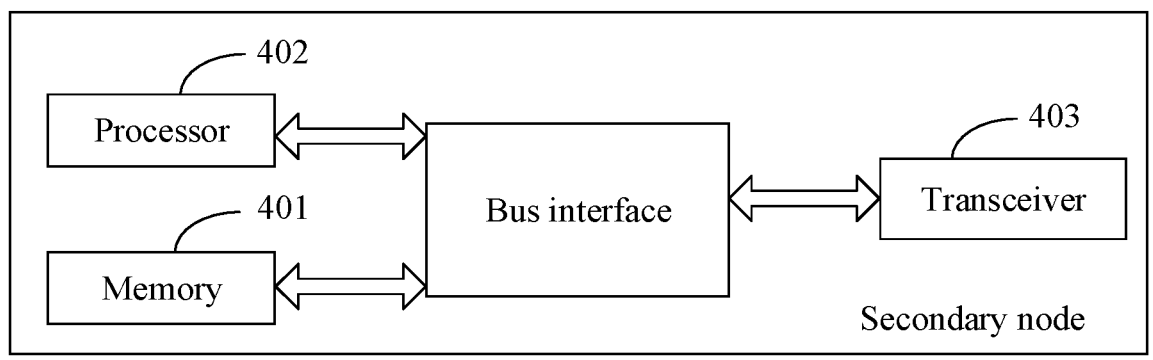
FIG. 4 is a structural schematic diagram of a Secondary Node, SN provided by an embodiment of the disclosure.

Referring to FIG. 4, based on the same inventive concept, an embodiment of the disclosure provides a base station, which is a Secondary Node, SN in dual-connection and multi-connection communication systems. The SN includes: a memory 401, a processor 402, and a transceiver 403, and the memory 401 and the transceiver 403 may be connected to the processor 402 through a bus interface (taking this as an example in FIG. 4), or may be connected to the processor 402 through connection lines according to embodiments of the present disclosure.

Here, the memory 401 may be configured to store programs. The transceiver 403 may receive the inter-node signaling message sent by the MN. The processor 402 is configured to read the instructions in the memory 401 to perform the process of: executing the PDCP data recovery process according to the inter-node signaling message, and the inter-node signaling message is used for instructing the SN to execute the PDCP data recovery process.

In one embodiment, the inter-node signaling message carries the indication information through a newly defined first field, and the indication information is used for instructing the SN to execute the PDCP data recovery process; and the first field is an optional attribute or mandatory attribute field; or
- the inter-node signaling message carries the indication information through a reused second field, and the second field includes at least two coding forms, different coding forms are used for carrying different information, and one of the at least two coding forms is used for carrying the indication information.

In one embodiment, the processor 402 is further configured to:
- determine whether the first field has a valid value for instructing the SN to execute the PDCP data recovery process; or determine whether the second field has a valid value for instructing the SN to execute the PDCP data recovery process before the processor executes the PDCP data recovery process according to the inter-node signaling message;
- determine to execute the PDCP data recovery process if the determination result is yes.

In one embodiment, if the second field reuses a PDCP change indication for notifying the SN to update a security key, and the coding form of the PDCP change indication when instructing the SN to execute the PDCP data recovery is different from the coding form when instructing the SN to update the security key, then the processor 402 is further configured to:
- determine to execute the PDCP data recovery process if it is determined that the PDCP change indication has a valid value for instructing the SN to execute the PDCP data recovery process; or
- determine to execute the security key update process if it is determined that the PDCP change indication has a valid value for instructing the SN to execute the security key update process.

In one embodiment, the inter-node signaling message is a message including a synchronous reconfiguration request, then the processor 402 is further configured to:
- determine whether to execute the PDCP data recovery process according to the synchronous reconfiguration request; and if the synchronous reconfiguration request does not carry an updated security key or the information instructing the SN to update a security key, the processor 402 can determine to execute the PDCP data recovery process;

determine to execute the PDCP data recovery process when the determination result is yes.

In one embodiment, the inter-node signaling message is further used for instructing the SN to execute a lower-layer synchronous reconfiguration process corresponding to the PDCP data recovery process, then the processor 402 is further configured to:

determine to execute the lower-layer synchronous reconfiguration process according to the inter-node signaling message; and the lower-layer synchronous reconfiguration process includes one or more of an RLC entity reestablishment process, an MAC entity reset process and a random access process.

Here, in FIG. 4, the bus architecture may include any numbers of interconnected buses and bridges, and In one embodiment link various circuits of one or more processors represented by the processor 402 and the memory represented by the memory 401. The bus architecture may further link various other circuits such as peripheral device, voltage regulator and power management circuit, which are all well known in the art and thus will not be further described again herein. The bus interface provides an interface. The transceiver 403 may be a plurality of elements, i.e., include a transmitter and a receiver, and provide the devices for communicating with various other devices over the transmission media. The processor 402 is responsible for managing the bus architecture and general processing, and the memory 401 may store the data used by the processor 402 when performing the operations.

Figure 5:
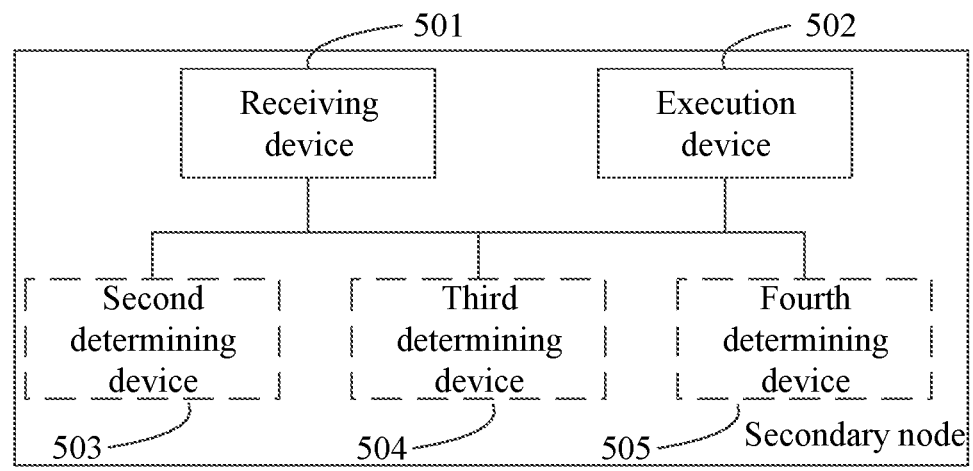
FIG. 5 is a structural schematic diagram of a Secondary Node, SN provided by an embodiment of the disclosure.

Referring to FIG. 5, based on the same inventive concept, an embodiment of the disclosure provides a base station, which is a Secondary Node, SN in dual-connection and multi-connection communication systems. The SN includes:

a receiving device 501 configured to receive an inter-node signaling message sent by a Master Node, MN; and the inter-node signaling message is used for instructing the SN to execute the PDCP data recovery process;

an execution device 502 configured to execute the PDCP data recovery process according to the inter-node signaling message.

In one embodiment, the inter-node signaling message carries the indication information through a newly defined first field, and the indication information is used for instructing the SN to execute the PDCP data recovery process; and the first field is an optional attribute or mandatory attribute field; or the inter-node signaling message carries the indication information through a reused second field, and the second field includes at least two coding forms, different coding forms are used for carrying different information, and one of the at least two coding forms is used for carrying the indication information.

In one embodiment, the SN further includes a second determining device 503;

the determining device is configured to determine whether the first field has a valid value for instructing the SN to execute the PDCP data recovery process; or determine whether the second field has a valid value for instructing the SN to execute the PDCP data recovery process;

the determining device is further configured to determine to execute the PDCP data recovery process if the determination result is yes.

In one embodiment, if the second field reuses a PDCP change indication for notifying the SN to update a security key, and the coding form of the PDCP change indication when instructing the SN to execute the PDCP data recovery is different from the coding form when instructing the SN to update the security key;

then the determining device is further configured to determine to execute the PDCP data recovery process if it is determined that the PDCP change indication has a valid value for instructing the SN to execute the PDCP data recovery process; or determine to execute the security key update process if it is determined that the PDCP change indication has a valid value for instructing the SN to execute the security key update process.

In one embodiment, the inter-node signaling message is a message including a synchronous reconfiguration request, then the SN further includes a third determining device 504;

the third determining device 504 is configured to determine whether to execute the PDCP data recovery process according to the synchronous reconfiguration request; and if the synchronous reconfiguration request does not carry an updated security key or information instructing the SN to update a security key, the third determining device 504 can determine to execute the PDCP data recovery process;

the third determining device 504 is further configured to determine to execute the PDCP data recovery process when the determination result is yes.

In one embodiment, the inter-node signaling message is further used for instructing the SN to execute a lower-layer synchronous reconfiguration process corresponding to the PDCP data recovery process, then the SN further includes a fourth determining device 505;

the fourth determining device 505 is configured to determine to execute the lower-layer synchronous reconfiguration process according to the inter-node signaling message; and the lower-layer synchronous reconfiguration process includes one or more of an RLC entity reestablishment process, an MAC entity reset process and a random access process.

This device can be used to perform the method provided by the embodiment shown in FIG. 1, so the functions that can be implemented by the functional devices of the device may refer to the description of the embodiment shown in FIG. 1 and will not be repeated, and the second determining device 503 to the fourth determining device 505 are also shown in FIG. 5, but it should be known that the second determining device 503 to the fourth determining device 505 are not mandatory functional devices, so they are shown in dashed lines in FIG. 5.

Based on the same inventive concept, an embodiment of the disclosure provides a computer readable storage medium storing the computer instructions, which cause a computer to perform the method as shown in FIG. 1 when running on the computer.

In a specific implementation process, the computer readable storage medium includes: Universal Serial Bus (USB) flash drive, mobile hard disk, Read-Only Memory (ROM), Random Access Memory (RAM), magnetic disk or compact disc or various storage media that can store the program codes.

In the embodiments of the disclosure, it should be understood that the disclosed devices and methods may be implemented in other ways. For example, the device embodiments described above are only schematic, for example, the device or the division of devices is merely a logical function division. In an actual implementation, there may be other division manners, for example, a plurality of devices or components may be combined or integrated to another system, or some features may be ignored or not performed. In addition, the displayed or discussed mutual coupling or direct coupling or communication connection may be implemented through the indirect coupling or communication connection between some interfaces, devices or devices, and may be in the electrical or other forms.

In the embodiments of the disclosure, various functional devices may be integrated into one processing device, or various devices may also be independent physical devices.

When the integrated device is implemented in the form of software functional device and sold or used as an independent product, it may be stored in a computer readable storage medium. The computer software product is stored in a storage medium, and includes several instructions used to enable a computer device (which may be, for example, personal computer, server, network device or the like) or a processor to perform all or some of the steps of the methods of various embodiments of the disclosure. The above-mentioned storage medium includes: universal serial bus flash drive, mobile hard disk, ROM, RAM, magnetic disk or compact disc or various media that can store the program codes.

What is claimed is:

1. A method for notifying execution of Packet Data Convergence Protocol, PDCP, data recovery, the method comprising:
   sending, by a Master Node, MN, an inter-node signaling message between the MN and a Secondary Node, SN, wherein the inter-node signaling message is used for instructing the SN to execute a PDCP data recovery process;
   carrying, by the MN, indication information through a newly defined first field in the inter-node signaling message, the indication information being used for instructing the SN to execute the PDCP data recovery process; wherein the newly defined first field is an optional attribute or mandatory attribute field; or
   carrying, by the MN, the indication information by reusing a second field in the inter-node signaling message; wherein the second field comprises at least two coding forms, different coding forms are used for carrying different information, and one of the at least two coding forms is used for carrying the indication information;
   wherein if the MN and the SN are in a Multi-RAT Dual Connectivity, MR-DC, scenario, the inter-node signaling message is a secondary node modification request message in a secondary node modification process initiated by the MN;
   wherein the second field reuses a PDCP change indication for notifying the SN to update a security key; wherein a coding form of the PDCP change indication when instructing the SN to execute the PDCP data recovery is different from a coding form when instructing the SN to update the security key.

2. The method according to claim 1, wherein before sending, by the MN, the inter-node signaling message between the MN and the SN to the SN to notify the SN to execute the PDCP data recovery process, the method further comprising:
   triggering, by the MN, an intra-MN primary cell handover process in the MN or an intra-Central unit, intra-CU, primary cell handover process in a central node of a radio access network, and determining, by the MN, to keep the SN and without a security key update.

3. The method according to claim 1, wherein the inter-node signaling message carries indication information that is encoded in a coding format of X2/Xn AP message or in a coding format of Radio Resource Control, RRC, message; wherein the indication information is used for instructing the SN to execute the PDCP data recovery process.

4. The method according to claim 1, wherein the inter-node signaling message comprising a synchronous reconfiguration request, and the SN determines whether to execute the PDCP data recovery process according to the synchronous reconfiguration request; wherein if the synchronous reconfiguration request does not carry an updated security key or information instructing the SN to update a security key, the SN determines to execute the PDCP data recovery process.

5. The method according to claim 1, wherein the inter-node signaling message is further used for instructing the SN to execute a lower-layer synchronous reconfiguration process corresponding to the PDCP data recovery process; wherein the lower-layer synchronous reconfiguration process comprises one or more of a Radio Link Control, RLC, entity reestablishment process, a Media Access Control, MAC, entity reset process and a random access process.

6. A method for executing Packet Data Convergence Protocol, PDCP, data recovery, the method comprising:
   receiving, by a Secondary Node, SN, an inter-node signaling message sent by a Master Node, MN; wherein the inter-node signaling message is used for instructing the SN to execute a PDCP data recovery process;
   executing, by the SN, the PDCP data recovery process according to the inter-node signaling message;
   wherein the inter-node signaling message carries indication information through a newly defined first field, and the indication information is used for instructing the SN to execute the PDCP data recovery process; wherein the newly defined first field is an optional attribute or mandatory attribute field; or
   the inter-node signaling message carries the indication information through a reused second field, wherein the reused second field comprises at least two coding forms, different coding forms are used for carrying different information, and one of the at least two coding forms is used for carrying the indication information;
   wherein before the executing, by the SN, the PDCP data recovery process according to the inter-node signaling message, the method further comprises:
   determining, by the SN, whether the newly defined first field has a valid value for instructing the SN to execute the PDCP data recovery process; or determining, by the SN, whether the reused second field has a valid value for instructing the SN to execute the PDCP data recovery process;
   determining, by the SN, to execute the PDCP data recovery process if a determination result is yes;
   wherein if the reused second field reuses a PDCP change indication for notifying the SN to update a security key, and a coding form of the PDCP change indication when instructing the SN to execute the PDCP data recovery is different from a coding form of the PDCP change indication when instructing the SN to update the security key, the method further comprises:
   determining, by the SN, to execute the PDCP data recovery process if the SN determines that the PDCP change indication has a valid value for instructing the SN to execute the PDCP data recovery process; or
   determining, by the SN, to execute a security key update process if the SN determines that the PDCP change indication has a valid value for instructing the SN to execute the security key update process.

7. The method according to claim 6, wherein the inter-node signaling message comprises a synchronous reconfiguration request, the method further comprises:
determining, by the SN, whether to execute the PDCP data recovery process according to the synchronous reconfiguration request;
determining, by the SN, to execute the PDCP data recovery process if the synchronous reconfiguration request does not carry an updated security key or information instructing the SN to update a security key.

8. The method according to claim 6, wherein the inter-node signaling message is further used for instructing the SN to execute a lower-layer synchronous reconfiguration process corresponding to the PDCP data recovery process, the method further comprises:
determining, by the SN, to execute the lower-layer synchronous reconfiguration process according to the inter-node signaling message; wherein the lower-layer synchronous reconfiguration process comprises one or more of an RLC entity reestablishment process, an MAC entity reset process and a random access process.

9. A base station, serving as a Master Node, MN in dual-connection and multi-connection communication systems, and comprising:
a memory configured to store instructions;
a processor configured to read the stored instructions in the memory to perform a process of:
sending an inter-node signaling message between the MN and a Secondary Node, SN to the SN via a transceiver, wherein the inter-node signaling message is used for instructing the SN to execute a PDCP data recovery process;
the transceiver configured to send data under control of the processor;
carrying indication information through a newly defined first field in the inter-node signaling message, the indication information being used for instructing the SN to execute the PDCP data recovery process; wherein the newly defined first field is an optional attribute or mandatory attribute field; or
carrying the indication information by reusing a second field in the inter-node signaling message; wherein the second field comprises at least two coding forms, different coding forms are used for carrying different information, and one of the at least two coding forms is used for carrying the indication information;
wherein if the MN and the SN are in an MR-DC scenario, the inter-node signaling message is a secondary node modification request message in a secondary node modification process initiated by the MN;
wherein the processor is further configured to read the stored instructions in the memory to perform a process of:
wherein the second field reuses a PDCP change indication for notifying the SN to update a security key; wherein a coding form of the PDCP change indication when instructing the SN to execute the PDCP data recovery is different from a coding form of the PDCP change indication when instructing the SN to update the security key.

10. The base station according to claim 9, wherein the processor is further configured to read the stored instructions in the memory to perform a process of: triggering an intra-MN primary cell handover process in the MN or an intra-Central Unit, CU, primary cell handover process in a central node of a radio access network, and determining to keep the SN and without security key update before sending the inter-node signaling message between the MN and the SN to the SN via the transceiver to notify the SN to execute the PDCP data recovery process.

11. The base station according to claim 9, wherein the inter-node signaling message carries indication information that is encoded in a coding format of X2/Xn AP message or in a coding format of Radio Resource Control, RRC, message; wherein the indication information is used for instructing the SN to execute the PDCP data recovery process.

12. The base station according to claim 9, wherein the inter-node signaling message comprises a synchronous reconfiguration request, and the SN determines whether to execute the PDCP data recovery process according to the synchronous reconfiguration request; wherein if the synchronous reconfiguration request does not carry an updated security key or information instructing the SN to update a security key, the SN determines to execute the PDCP data recovery process.

13. The base station according to claim 9, wherein the inter-node signaling message is further used for instructing the SN to execute a lower-layer synchronous reconfiguration process corresponding to the PDCP data recovery process; wherein the lower-layer synchronous reconfiguration process comprises one or more of an RLC entity reestablishment process, an MAC entity reset process and a random access process.

14. A base station, serving as a Secondary Node, SN in dual-connection and multi-connection communication systems, and comprising:
a memory configured to store instructions;
a processor configured to read the stored instructions in the memory to perform a process of:
receiving an inter-node signaling message sent by a Master Node, MN via a transceiver; wherein the inter-node signaling message is used for instructing the SN to execute a PDCP data recovery process;
executing the PDCP data recovery process according to the inter-node signaling message;
the transceiver configured to receive data under control of the processor;
wherein the inter-node signaling message carries indication information through a newly defined first field, and the indication information is used for instructing the SN to execute the PDCP data recovery process; wherein the newly defined first field is an optional attribute or mandatory attribute field; or
the inter-node signaling message carries the indication information through a reused second field, wherein the reused second field comprises at least two coding forms, different coding forms are used for carrying different information, and one of the at least two coding forms is used for carrying the indication information;
wherein the processor is further configured to read the instructions in the memory to perform a process of:
determining whether the newly first field has a valid value for instructing the SN to execute the PDCP data recovery process; or determining whether the reused second field has a valid value for instructing the SN to execute the PDCP data recovery process before executing the PDCP data recovery process according to the inter-node signaling message;
determining, by the SN, to execute the PDCP data recovery process if a determination result is yes;
wherein if the reused second field reuses a PDCP change indication for notifying the SN to update a security key, and a coding form of the PDCP change indication when instructing the SN to execute the PDCP data recovery is different from a coding form of the PDCP change indication when instructing the SN to update the security key, the processor is further configured to read the instructions in the memory to perform a process of:
determining to execute the PDCP data recovery process if it is determined that the PDCP change indication has a valid value for instructing the SN to execute the PDCP data recovery process; or
determining to execute a security key update process if it is determined that the PDCP change indication has a valid value for instructing the SN to execute the security key update process.

15. The base station according to claim 14, wherein the inter-node signaling message comprises a synchronous reconfiguration request, the processor is further configured to read the stored instructions in the memory to perform a process of:

determining whether to execute the PDCP data recovery process according to the synchronous reconfiguration request;
determining to execute the PDCP data recovery process if the synchronous reconfiguration request does not carry an updated security key or information instructing the SN to update a security key.

16. The base station according to claim 14, wherein the inter-node signaling message is further used for instructing the SN to execute a lower-layer synchronous reconfiguration process corresponding to the PDCP data recovery process, the processor is further configured to read the instructions in the memory to perform a process of:
determining to execute the lower-layer synchronous reconfiguration process according to the inter-node signaling message; wherein the lower-layer synchronous reconfiguration process comprises one or more of an RLC entity reestablishment process, an MAC entity reset process and a random access process.

* * * * *